June 29, 1926.  1,590,392

A. H. PETERS

SELF LUBRICATING JOURNAL BEARING

Filed Dec. 23, 1922

Arthur H. Peters
INVENTOR

BY
ATTORNEY

Patented June 29, 1926.

UNITED STATES PATENT OFFICE.

ARTHUR H. PETERS, OF FORT WAYNE, INDIANA.

SELF-LUBRICATING JOURNAL BEARING.

Application filed December 23, 1922. Serial No. 608,618.

The invention relates to a new and useful method of making self-lubricating journal bearings and particularly to the fabrication of a bearing having incorporated with one of the members thereof a hollow core formed of self-lubricating material.

The object of the invention is to provide a simple and economical process of making a journal bearing whereby a self-lubricating member is secured and incorporated in the bearings in novel manner and at small expense, all expensive machining of the metal portion of the bearing being avoided.

The invention consists in the steps and matters hereinafter described and set forth in the claims.

Figure 1:
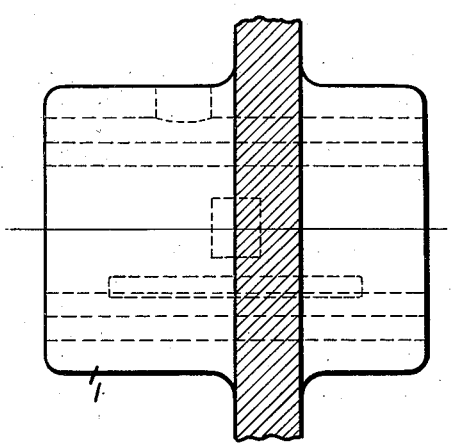
Figure 2:
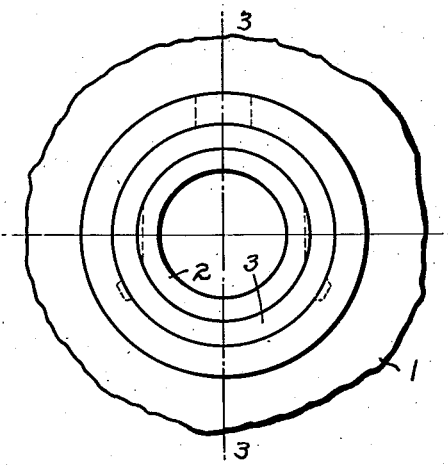
Figure 3:
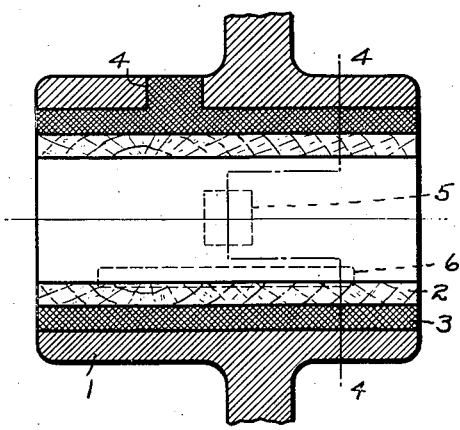
Figure 4:
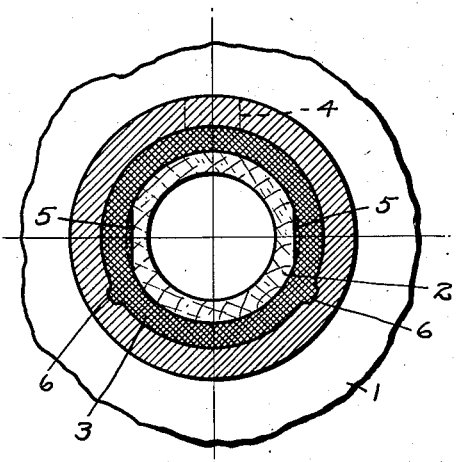
Figure 5:
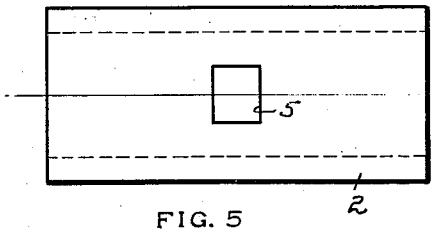
Figure 6:
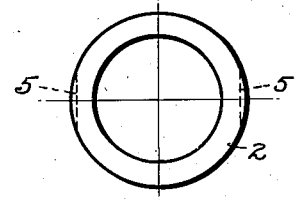

In the accompanying drawings Figure 1 is a side elevational view of a completed bearing; Fig. 2 an end elevation of the same; Fig. 3 a cross-sectional view on line 3—3 of Fig. 2; Fig. 4 a cross-sectional view on line 4—4 of Fig. 3; Fig. 5 a plan view of the hollow core and Fig. 6 an end view of the core.

Hollow cores have been used in bearings heretofore, the practice being, in forming the bearing, to press the core into the housing or casting. This method requires machining of the cored casting in order that the core shall make an exceedingly snug fit within it and to properly align therein. By my invention I overcome and make unnecessary machining of the housing or casting and provide a process requiring no machining of the housing or casting and firmly anchor the core in the housing in exactly true position.

The most important characteristic of the process resides in preforming the hollow core of self-lubricating material, such as oil-saturated wood, graphite, &c., with one or more cavities or grooves in its exterior periphery. The hollow core is inserted in a housing or a coring in a casting that is to support the bearing and properly positioned therein. Molten material is then poured into the space between the outer periphery of the core and the inner wall of the housing or coring. The molten material fills the cavities or grooves in the periphery of the hollow core and, when the material solidifies upon cooling, the core is permanently attached to and anchored in the housing or coring.

The process of forming the bearing and the finished article will now be described, reference being had to the accompanying drawings. 1 designates a metallic housing or casting of the desired or selected form in which the core is to be placed. The inner wall of the cored sleeve or casting is not machined. 2 designates the hollow core that is formed of self-lubricating material of the selected type, size and shape. The housing or casting is then mounted in a fixed manner and the core is axially arranged within it, as by an arbor; then the molten material, such as Babbitt metal or other material that will solidify upon cooling, is poured into the space between the core and the inner wall of the cored housing. If the casting is set on end the material is poured in at the open upper end, but if the casting is mounted so that its coring is horizontally disposed, then an opening 4 is formed in the wall of the casting that communicates with its coring, through which the material is poured, the opposite ends of the housing or casting being closed by suitable means to retain the material until it cools and solidifies. The solidified material is indicated at 3.

The core is formed with the exterior cavities or grooves 5 into which the molten material runs. When the material has solidified it rigidly locks the core within the housing, the material in the cavities 5 holding the core from rotation. The core, therefore, forms the bearing surface of the journal and its lubricant continuously lubricates the rotating body supported in it.

By the process above described small journal bearings are formed, but it is evident that the process may be applied readily to the formation of large bearings as well.

Generally in the forming of the housing or casting 1 grooves or slots 6 will be formed in its inner wall into which grooves or slots the molten material will flow and positively lock the solidified material in the housing or casing.

It is evident that numerous forms of material that are self lubricating may be used for the hollow core and that any material that may be reduced to a molten condition for pouring in between the hollow core and the housing and that will thereafter solidify for locking the hollow core in the housing will accomplish the invention.

What I claim is:

1. The process of forming self-lubricating bearings which consists in preforming a hollow core of lubricant-saturated wood with cavities in its outer periphery; then axially aligning the core in a cored housing whose inner diameter is greater than the outer diameter of the core and whose inner wall is grooved longitudinally, and finally pouring into the space between the core and the housing a molten material adapted to solidify upon cooling, said material filling the cavities and the grooves and permanently securing the core to the housing.

2. A self-lubricating journal bearing comprising a cored housing, a hollow core formed of lubricant-saturated wood axially arranged in the housing and spaced from the inner wall thereof and having cavities in its outer periphery and solidified molten material in said space and cavities to anchor the core in the housing.

In witness whereof I have hereunto subscribed my name this 20th day of December, 1922.

ARTHUR H. PETERS.